United States Patent [19]
Bahnsen

[11] 3,747,496
[45] July 24, 1973

[54] FILM PACKET AND HOLDER
[76] Inventor: Gerhard I. W. Bahnsen, Box 1297, South Lake Tahoe, Calif. 95705
[22] Filed: July 15, 1971
[21] Appl. No.: 162,824

[52] U.S. Cl. .................................. 95/72, 95/67
[51] Int. Cl. .................................. G03b 17/26
[58] Field of Search .............. 95/72, 66, 67, 68, 95/71

[56] References Cited
UNITED STATES PATENTS

| 1,470,134 | 10/1923 | Atherton, Jr. | 95/66 |
|---|---|---|---|
| 915,988 | 3/1909 | Moore | 95/72 |
| 1,505,000 | 8/1924 | Whiting | 95/72 |
| 2,638,826 | 5/1953 | Fairbank | 95/72 |
| 847,730 | 3/1907 | Colwell | 95/72 |
| 2,451,638 | 10/1948 | Suydam | 95/66 |
| 539,557 | 5/1895 | Stubel | 95/66 |

FOREIGN PATENTS OR APPLICATIONS

| 10,555 | 5/1909 | Great Britain | 95/72 |
|---|---|---|---|
| 171,332 | 10/1904 | Germany | 95/66 |

Primary Examiner—Robert P. Greiner
Attorney—William P. Green

[57] ABSTRACT

An assembly for holding a film in a camera, and including a holder having front and rear sections between which a film packet is received and retained, with the packet including an outer envelope, a film located in the envelope and adapted to be exposed through a window at one side of the envelope, and a light shield sleeve received within the envelope and about the film and slidably retractable relative to the envelope and film. The two section holder functions when closed to retain the envelope and film against movement with the sleeve when the latter is withdrawn slidably to its retracted position.

5 Claims, 13 Drawing Figures

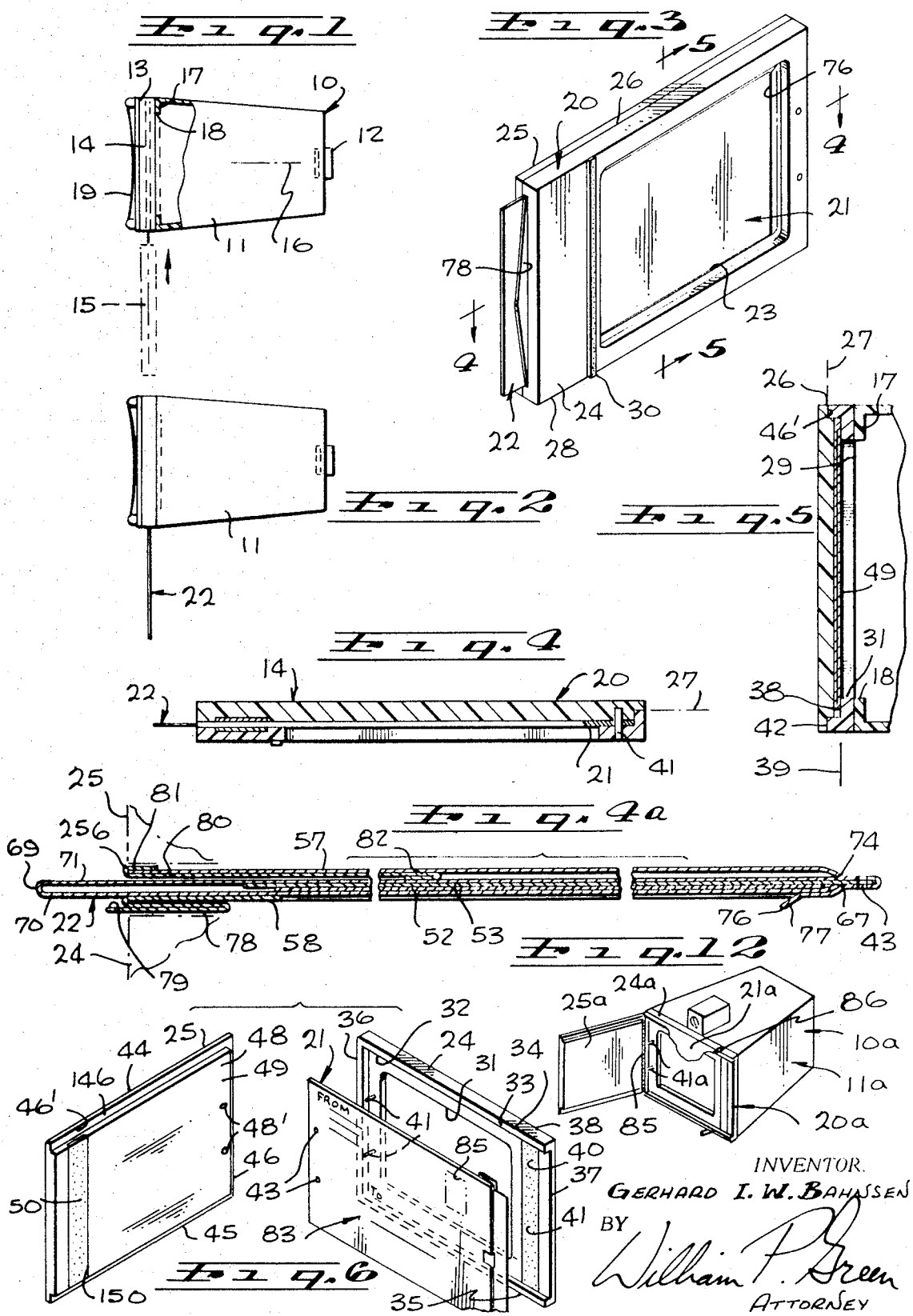

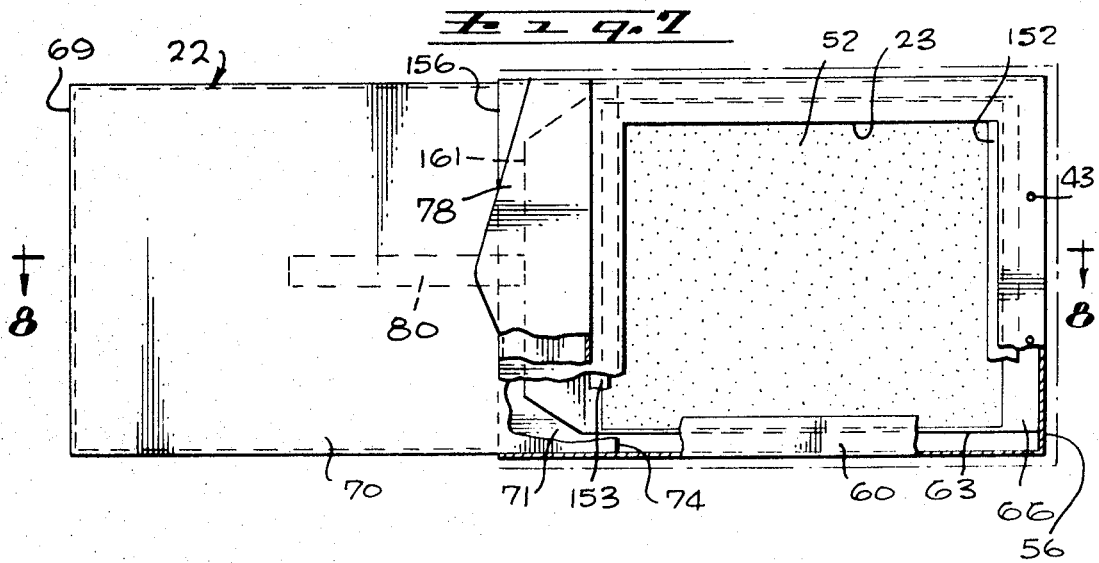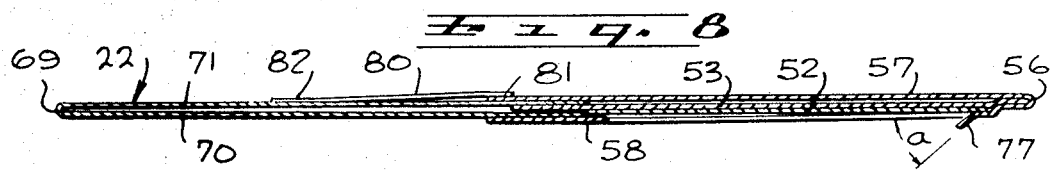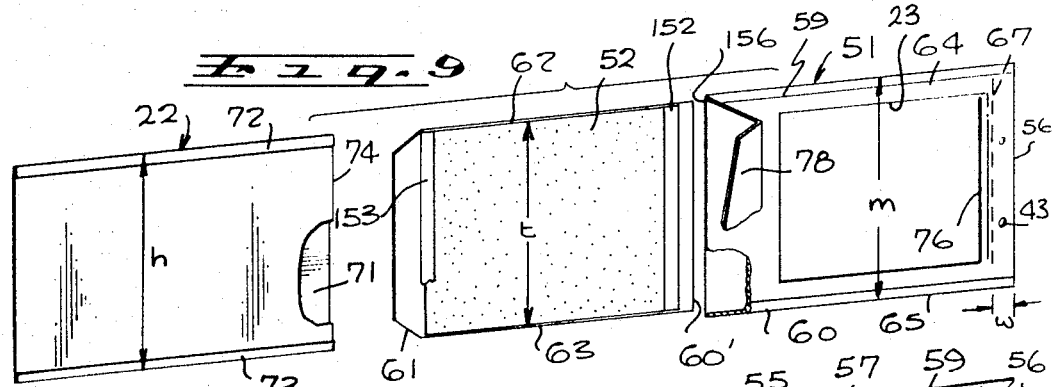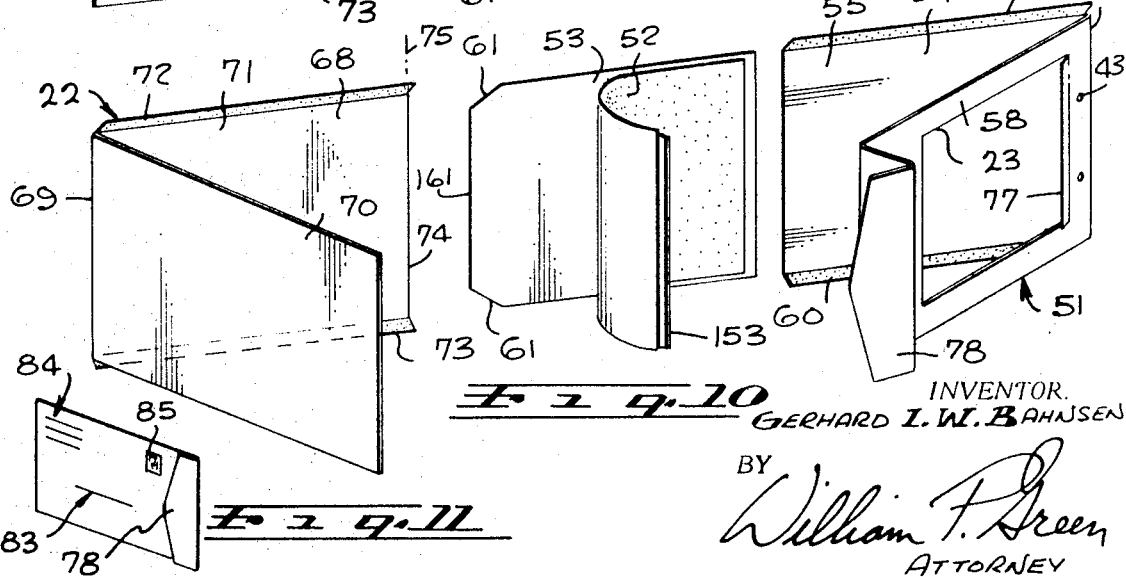

FILM PACKET AND HOLDER

BACKGROUND OF THE INVENTION

This invention relates to improved film packets and holders for inserting a photographic film into a camera for exposure thereby.

Most conventional flat film holders are very inconvenient and cumbersome to handle, load, and transport from place to place. Each such holder must be relatively thick in order to fit within the usual film pack receiving recess of a camera, and to effectively contain the film, light shield slide, etc. Further, these conventional holders are very expensive, and as a result most photographers only carry a very few of the holders at any one time, and are consequently limited to the taking of a very few pictures. Additionally, the loading and unloading of the holders must be done in a dark room, thus adding to the overall inconvenience of conventional film pack photography.

SUMMARY OF THE INVENTION

The present invention provides a unique arrangement in which a single main holder may successively receive and hold a series of inexpensive and low cost film packs, which packs may be much thinner than conventional film holders, so that the single main holder and a large number of the film packs usable therewith may be stored and handled within a much smaller space than a relatively few of the bulkier conventional holders. The main holder of the present invention may be formed of two front and rear sections, between which one of the film packets is receivable at a proper location for exposure of the film.

The film packet itself includes a light shield element which is withdrawable slidably relative to the film proper, after the packet has been located in the holder, to thus by such withdrawal uncover the film for exposure by the camera. These two sections of the main holder function when closed to retain the film against movement with the light shield when the latter is withdrawn. Preferably, the packet includes also an outer envelope, having a window at a forward side through which the film is exposable. The light shield element desirably takes the form of a sleeve which is receivable about the film and within the envelope to close off the admission of light to the film through the window.

An additional feature of the invention relates to the provision of unique means for limiting the outward sliding movement of a light shield relative to a film at a predetermined retracted position. For this purpose, I desirably utilize a flexible connector strap, which may be connected at opposite ends to the outer envelope of the packet and the retractable light shield sleeve in a relation halting outward sliding movement of the sleeve at the desired location.

BRIEF DESCRIPTION OF THE DRAWING

The above and other features and objects of the invention will be better understood from the following detailed description of the typical embodiments illustrated in the accompanying drawings in which:

FIG. 1 is a plan view of a camera having a film holding assembly constructed in accordance with the invention;

FIG. 2 is a view similar to FIG. 1, but showing the light shield in its laterally withdrawn position to enable exposure of the film by the camera;

FIG. 3 is a perspective view of the overall film holding assembly of FIGS. 1 and 2;

FIG. 4 is a horizontal section taken on line 4—4 of FIG. 3;

FIG. 4a is an enlarged section taken on line 4—4 of FIG. 3, but showing only the film packet without the outer holder;

FIG. 5 is a vertical section taken on line 5—5 of FIG. 3;

FIG. 6 shows the film holding assembly of FIG. 3 with the back section of the outer holder removed from the front section;

FIG. 7 is a front view of the film packet, removed from the outer holder, and with the light shield sleeve withdrawn laterally to its retracted position;

FIG. 8 is a horizontal section taken on line 8—8 of FIG. 7, with the thickness of the various layers of material exaggerated for clarity;

FIG. 9 is an exploded perspective view showing the various elements of the film packet in separated condition;

FIG. 10 is an exploded view similar to FIG. 9, but showing the manner in which the various elements of the FIG. 9 arrangement are formed from different pieces of sheet material;

FIG. 11 is a fragmentary perspective view showing a corner portion of the packet in a position such as that of FIG. 6, but with the closure flap sealed in its closed condition for marking; and, FIG. 12 shows a variational form of film holding assembly embodying the invention, of a type in which the main film holder is formed as a part of and permanently attached to the camera itself.

DESCRIPTION OF THE PREFERRED EMBODIMENTS

Referring first to FIG. 1, I have shown at 10 a camera typically having a rigid body 11 which carries at its forward end the usual lens and shutter assembly 12. The camera is of a type having a conventional rear guideway 13 within which a rectangular film holding assembly 14 is receivable by sliding movement in a plane 15 disposed transversely of the main axis 16 of the camera and its lens. The camera has the usual back wall 17 containing a rectangular aperture 18 through which the film within film holding assembly 14 can be exposed. An essentially planar back element or cover 19 extends across the back side of the guideway 13, and is spring urged forwardly to retain the film holding assembly in proper light sealed relation with respect to the camera.

The assembly 14 of FIG. 1 is externally rectangular and dimensioned to correspond to the outer shape and size of a conventional film holder for use in a standard film pack type of camera. Internally, however, this holding assembly 14 is of different construction, and specifically includes an outer two section main holder 20 and a relatively thin and inexpensive inner film packet 21 contained within outer holder 20. The inner packet 21 has a light shield element 22 formed as a part of the packet and which is withdrawable slidably and laterally to the position illustrated in FIG. 2 to open a window 23 in the front side of the packet through which the film in the packet may be exposed by the camera.

To now describe the structure of film holder 20 in detail, the two front and rear sections or halves 24 and 25 meet at 26 in a vertical plane represented at 27 in FIGS. 4 and 5. The front section 24 has a forward face 28 which is engageable forwardly against the back surface 29 of wall 17 of the camera, and which is planar except at the location of a vertical rib 30 (FIG. 3) which projects forwardly a short distance for reception within the usual narrow detent groove formed in wall 17, in a relation retaining holder 20 against removal from guideway 13. Section 24 has a rectangular opening 31 which is dimensioned in correspondence with and positioned to register with rectangular opening 18 in wall 17, to pass light from the lens to the film within packet 21.

At its rear side, forward section 24 of the film holder 20 contains a recess 32 which is of a rectangular shape corresponding essentially to the peripheral rectangular shape of film packet 21, to receive that packet in closely confined and located position within recess 32. This recess is defined by a peripheral flange 33 on section 24, which flange projects rearwardly a short distance, and which flange extends continuously across the entire upper edge 34 of the film holder, the entire lower edge 35, and the inner edge 36, but does not extend along the vertical outer edge 37 of section 24. The rear face or surface 38 of section 24, defining the front wall of recess 32, is planar and lies in a vertical plane 39, except at the location of a black light seal cushion 40 which may be received within a shallow vertical recess or groove 41 formed in wall surface 38. This light shield element may for example be formed as a strip of black velvet material engageable with packet 21 in a manner forming a light seal at the outer edge of the packet. Near the inner or leftward extremity of recess 32, section 24 may carry two rearwardly projecting parallel vertically spaced pins 41, which desirably extend parallel to axis 16 of the camera, and which preferably project rearwardly a short distance beyond the vertical plane 27 of the rear surface 42 of peripheral flange 33. As will appear at a later point, the packet 21 contains two apertures 43 which receive pins 41 to hold the packet in the FIG. 3 properly oriented position within recess 32 of the forward section 24 of the holder.

The rear section 25 of film holder 20 is peripherally of the same rectangular shape as forward section 24, and has along its upper and lower edges 44 and 45, and its inner vertical edge 46, a narrow recess 146 into which peripheral flange 33 of the forward section projects, for engagement of that flange with a forwardly facing surface 46' on section 25 at those upper and lower and inner edges. Within the space which is bounded by the peripheral recesses 146, the section 25 has a portion 48 which projects forwardly a short distance into recess 32 of forward section 24, and which has a forward planar vertical surface 49 extending across the entire area of recess 32 except at the location of a vertical strip of black velvet or other light sealing material 50 contained within a shallow vertical groove 150 formed in section 25 (See FIG. 6). Light seal element 50 is located opposite the previously mentioned forward light seal element 40 in the assembled condition of film holder 20, and both are located laterally beyond opening 31 in forward section 24. Also, both of these light seal elements 40 and 50 extend vertically through the entire distance between the top and bottom flanges 33, to form with the peripheral flange a light seal extending continuously about the film. The front to rear spacing between back surface 38 of forward section 24 and front surface 49 of rear section 25 is just great enough to receive and closely confine and retain the film packet 21 between the two sections. The portion 48 of rear section 25 may have two small recesses or bores 48' formed near its inner edge at a location to receive the rearwardly projecting ends of pins 41 in the assembled condition of the holder 20.

The film packet 21 which is removably received and retained within holder 20, and between the two sections 24 and 25 of the holder, may be considered as consisting essentially of three elements as shown in exploded perspective in FIG. 9. More particularly, these elements include an outer envelope 51, a film 52, preferably mounted on a carrier sheet 53, and the previously mentioned light shield sleeve 22. These elements are assembled together in the relationship illustrated in FIGS. 4, 4a, 5, 7 and 8. FIG. 10 illustrates the manner in which the three parts of the packet are formed from appropriate sheet material.

With reference first to the outer envelope 51, this envelope may be formed from an elongated horizontal substantially rectangular sheet 55 of paper or the like, which is folded along a vertical line 56 to define a rear rectangular panel 57 and a forward rectangular panel 58 which overlies panel 57. These two panels 57 and 58 are secured together along their upper parallel edges by a strip of light sealing tape 59, and along their lower edges by a second strip of light sealing tape 60, to thus in the FIG. 9 condition form an envelope which is closed at the inner edge 56 and at its upper and lower edges, but is open at its outer edge 156. The front panel or wall 58 of the envelope contains the previously mentioned rectangular opening or window 23 through which light from the lens passes to expose the film 52.

The film 52 is rectangular and is secured removably to the carrier sheet 53, as by provision of two vertical strips 152 and 153 of a thin easily tearable or removable adhesive paper tape securing the opposite side edges of the film to sheet 53. Sheet 53 may be formed of paper or the like and is rectangular except at the location of two beveled or tapered corners 61 at its outer edge 161 which are tapered to facilitate movement of sleeve 22 to a position about sheet 53 and the film. The vertical extent $t$ of sheet 53 and the carried film 52, between horizontal upper and lower edges 62 and 63 of sheet 53 and the film is somewhat less than the vertical extent $m$ of the rectangular space formed within envelope 51, between the upper and lower horizontal edges 64 and 65 of that space, so that sheet 53 and the film when received within the envelope can leave narrow gaps or clearance spaces within the envelope at the top and bottom of sheet 53. The inner vertical edge 60 of sheet 53 is inserted to a position of engagement with the inner vertical fold edge 56 of envelope 51, with the inner edge portions of the rear and front panels 57 and 58 of the envelope then being secured to opposite sides of the corresponding inner edge portion of sheet 53 by an appropriate adhesive at the area designated 66 in FIG. 7. The previously mentioned apertures 43 formed in the packet are located within this cemented area, and are completely surrounded by the adhesive, to form an effective light tight seal about those apertures. The apertures extend through both of the rear and front panels 57 and 58 of the envelope, and also through the inner edge portion of film carrying sheet 53, so that reception of pins 41 within these apertures can very positively hold both the envelope and the film against withdrawal from holder 20 when light shield 22 is withdrawn. To describe more specifically the area 66 at which the various discussed layers are adhered together, this area is rectangular and vertically elongated and is defined at one side by the vertical line 56 and at its opposite side by a parallel vertical line designated 67 in FIG. 9. The adhesive extends across the entire horizontal width dimension w between these lines, and also along the entire vertical height of sheet 53, as well as slightly vertically beyond the upper and lower edges of sheet 53 to secure the panels 57 and 58 of the envelope directly to one another at locations above and beneath sheet 53, to the locations of the upper and lower edges of the envelope. In the FIG. 4a closed condition of the packet, the edge 67 of the adhesive area is engageable continuously, entirely about the film, with an inner edge 74 of the light shield sleeve 22 in a manner forming a light seal about the film.

The sleeve 22 may be formed from a single elongated rectangular sheet 68 of light shielding paper or other material (FIG. 10), which may be folded at 69 along a vertical line, to form identical front and rear panels 70 and 71 which are retained together at their upper and lower parallel horizontal edges by two light sealing tapes 72 and 73. Thus, a peripheral seal is formed entirely about the sleeve 22 except at the location of its inner edge 74, which edge lies in a vertical plane 75. The vertical height h of sleeve 22 is slightly greater than the vertical height t of film 52 and its mounting sheet 53, to be received slidably about that film and sheet, and is slightly less than the internal vertical height m of rectangular envelope 51, to be received slidably within that envelope. At the inner vertical edge 76 of opening 23 in the envelope, the sheet material of front panel 58 may form a narrow outwardly bent vertical tab 77, whose angularity a with respect to the plane of the packet 21 causes this tab to act as a camming element which upon sliding movement of sleeve 22 relative to the envelope and film will act to engage the inner edge 74 of the forward panel 70 of the sleeve and cam it rearwardly for movement to a position behind the inner edge of front panel 58 of the envelope as the inner edge of the sleeve reaches the limit of its inward movement.

When packet 21 is contained within the rigid holder 20, and sleeve 22 of the packet is in its fully inserted position of FIG. 4a, the outer edge portion 69 of the sleeve projects outwardly a short distance beyond the outer extremity of both of the sections 24 and 25 of holder 20, to thus be accessible for an operator to grasp the sleeve and pull it outwardly from its FIGS. 1, 3, 4 and 4a light blocking position to its FIGS. 2, 7 and 8 picture taking position. In the mentioned fully inserted position of the sleeve, its portion 69 also projects laterally outwardly beyond the outer edge 256 of the rear panel 57 of envelope 51, to further facilitate grasping of the sleeve. The outer edge portion 78 of the forward panel 58 of the envelope is of a length greater than rear panel 57, and is capable of projecting laterally outwardly a substantial distance beyond edge 256 of the rear panel, and also beyond outer edge 69 of the sleeve, so that edge portion 78 of panel 58 forms of closure flap, which may be folded rearwardly about portion 69 and inwardly to overlap edge 256, and then be adhered to the rear panel adjacent its edge 256 (See FIG. 11) in a manner closing the envelope for mailing or other handling. Flap 78 is initially folded to the doubled condition shown in FIG. 4a, in which it does not interfere with grasping of portion 69 of the sleeve 22. For securing the flap in the FIG. 11 closed condition, the flap may have an appropriate adhesive substance 79 applied to its surface adjacent the outer edge of the tab, typically a water soluble adhesive which when moistened will adhere to rear panel 57 in the manner of a conventional envelope.

In order to limit the outward sliding movement of light shield sleeve 22 at the retracted position of FIGS. 7 and 8, in which position the sleeve is still received partially within envelope 51 and partially about film carrying sheet 53, I provide a flexible strap or tape 80, having a first end adhered at 81 to the outer surface of rear panel 57 of the envelope adjacent its edge 256, and having a second end adhered at 82 to a rear surface of the sliding sleeve 22. This strap may typically be formed of a suitable length of flexible paper or the like. When sleeve 22 is slid inwardly toward its fully inserted position in the envelope, strap 80 flexes to also move into the envelope in the manner illustrated in FIG. 4a. Upon outward movement, the strap 80 reaches its fully extended position of FIG. 8 in a predetermined retracted position in which the inner edge of the sleeve preferably still projects a short distance inwardly beyond the outer edge 256 of panel 57 of the envelope.

As seen in FIG. 6, the rear surface of back panel 57 of the envelope may carry markings for use in addressing the envelope in order to mail the exposed film, with these markings typically including the word "To" and a series of blank lines at 83 for indicating the location at which the name and address of the addressee are to be written, and also including the word "From" and a series of associated lines at 84 for indicating the sender and his address, as well as a rectangle at 85 defining the area in which a stamp may be placed.

In order to assure an effective light seal for protecting the film against accidental exposure, all of the paper, tape, and/or other sheet material from which the various elements 51, 53 and 22 of the packet are formed is completely opaque and is preferably black except that the outer surface of the envelope may if desired be of another color for appearance sake. Similarly, the best light sealing characteristics are obtained if all of the surfaces of the two rigid sections 24 and 25 of the main outer holder 20 are black.

In using the film holding assembly of FIGS. 1 to 11, a user first separates the two holder sections 24 and 25, then places an unexposed film packet 21 within the recess 32 formed in the back side of forward section 24, with pins 41 projecting through apertures 43 in the packet, following which the rear section 25 of the holder is placed against the back side of front section 24 and the packet, to form the assembly illustrated in FIG. 3. This entire assembly can then be handled in the same manner as a conventional film holder, being inserted slidably from the broken line position of the FIG. 1 to the full line position of that Figure. When the holder 20 reaches the fully inserted position, reception of rib 30 within a mating vertical groove in the rear wall 17 of the camera releasably retains the assembly against unwanted withdrawal. The user may then open the film packet by pulling sleeve 22 outwardly to the position of FIG. 2, 7 and 8, so that the film may be exposed by opening of the camera shutter. After such exposure, the sleeve is returned inwardly to the position of FIG. 4, following which the entire assembly 14 may be removed, so that sections 24 and 25 may be separated, packet 21 may be removed, and another similar packet be inserted in the holder 20, for the taking of another picture. Thus, only a single main holder 20 is required, for use with a series of thin, inexpensive and easily handled and stored packets 21. After a particular packet has been exposed, it may be closed, and sealed in closed condition by flap 78, to positively retain it against unwanted further exposure during subsequent handling or mailing. The tab when closed retains sleeve 22 tightly against the edge 67 of cemented region 66 of the envelope, and against even slight withdrawal from the envelope, to thus assure maintenance of an effective light tight seal about the film at edge 74 of the sleeve 22.

FIG. 12 shows a variational arrangement which may be considered as identical to that of FIGS. 1 to 11 except that the outer holder 20a corresponding to holder 20 of the first form is permanently mounted to the body 11a of camera 10a. More particularly, the front section 24a of the holder 20a (corresponding to section 24 of FIG. 3) is formed integrally with the remainder of camera body 11a and as the rear wall of that camera body, while the second or rear section 25a of holder 20a is connected at one of its edges by a vertical hinge 85 to front section 24a for swinging movement rearwardly to an open position such as that shown in FIG. 12 in which the rear face of front section 24a is accessible for reception or removal of a packet 21a corresponding to the packet 21 in the first form of the invention. Appropriate spring detents 86 may be provided on the forward section 24a for engaging the edges of section 25a in a manner releasably retaining that section in its forward closed position in which pictures are taken. After a packet has been inserted in the holder of FIG. 12 and the holder has been closed, the light shield sleeve of the packet may be slid laterally to its retracted open position to allow a picture to be taken, following which the sleeve is returned inwardly to its closed position so that the packet may be removed, and be sealed in closed condition by its closure flap. The envelope and film are retained against sliding movement with the sleeve by pins 41a corresponding to those shown in 41 in FIG. 6.

While certain specific embodiments of the present invention have been disclosed as typical, the invention is of course not limited to these particular forms, but rather is applicable broadly to all such variations as fall within the scope of the appended claims.

I claim:

1. A packet comprising a photographic film; an essentially rectangular outer envelope disposed about said film and having front and rear walls secured together to close the envelope along two top and bottom essentially parallel edges thereof and generally vertically along a closed first end of the envelope; said envelope being open along a second end thereof; said front wall containing a window through which said film can be exposed; a light shield sleeve formed of opaque material slidably received within said envelope and about said film; said sleeve having front and rear walls located at front and rear sides respectively of said film and which are secured together to close said sleeve along two top and bottom essentially parallel edges and generally vertically along an end thereof corresponding to said open end of said outer envelope, but being open at its opposite end in a relation enabling sliding movement of said sleeve relative to said envelope and film from an inner shielding position enclosing the film and protecting it against exposure to a slidably retracted position enabling exposure of the film through said window; said film having means at an inner end thereof defining a film retaining edge projecting beyond said window to a location between said front and rear walls of said outer envelope at said closed end thereof; and adhesive material securing said front and rear walls of the envelope to said film retaining edge along a generally vertically extending region at said closed end of the envelope; there being at least one aperture extending through said front and rear walls of the envelope and through said film retaining edge at said region at which said walls and edge are adhered together by said adhesive and adapted to receive a locating pin in a relation holding the envelope and film against movement with said sleeve upon relative sliding withdrawal thereof.

2. A packet as recited in claim 1, in which said sleeve has an edge at said open end thereof which, in said shielding position of the sleeve, is engageable against said walls of the envelope and said film retaining edge along an edge of said region at which they are adhered together to form a light tight seal at said open end of the sleeve.

3. A packet as recited in claim 1, including a closure flap on said open end of the envelope adapted to be sealed in a closed position in which it blocks sliding movement of the sleeve from said active position.

4. A packet as recited in claim 1, including a flexible strap connected at opposite ends to said sleeve and said envelope and limiting withdrawal of the sleeve at a predetermined retracted position not fully removed from the envelope.

5. The combination comprising a packet as recited in claim 1 and a holder including two relatively openable sections defining a recess for receiving said packet, said holder being constructed to allow sliding withdrawal of said sleeve from said envelope and film while the envelope and film are in the holder, said holder having a pin projecting into said aperture in said front and rear walls of said envelope and said film retaining edge to retain the envelope and film in the holder upon said withdrawal of the sleeve.

* * * * *